United States Patent [19]

Krotky

[11] Patent Number: 4,867,007

[45] Date of Patent: Sep. 19, 1989

[54] CRANKSHAFT FOR RECIPROCATING PISTON ENGINE

[75] Inventor: Peter Krotky, Simmozheim, Fed. Rep. of Germany

[73] Assignee: Porsche Antiegesellschaft, Stuttgart, Fed. Rep. of Germany

[21] Appl. No.: 26,383

[22] Filed: Mar. 16, 1987

[30] Foreign Application Priority Data

Mar. 15, 1986 [DE] Fed. Rep. of Germany ....... 3608810

[51] Int. Cl.⁴ .............................. F16C 3/04; F16C 3/20
[52] U.S. Cl. ......................................... 74/595; 74/603; 74/605; 123/192 B; 184/11.4
[58] Field of Search ................. 74/405, 603, 591, 595, 74/604, 596; 29/6; 184/11.4, 14; 123/192 B, 197 R; 384/429

[56] References Cited

U.S. PATENT DOCUMENTS

| | | |
|---|---|---|
| 962,445 | 6/1910 | Marble . |
| 1,431,415 | 10/1922 | Parsons et al. .................. 403/379 X |
| 2,021,262 | 11/1935 | Moore .............................. 74/595 X |
| 2,680,428 | 6/1954 | Tatar ................................ 74/595 X |
| 3,088,783 | 5/1963 | Conover . |
| 3,166,054 | 11/1965 | Conover ......................... 74/603 X |
| 4,262,548 | 4/1981 | Haft et al. . |
| 4,517,933 | 5/1985 | Yasutake ......................... 74/603 X |

FOREIGN PATENT DOCUMENTS

| | | | |
|---|---|---|---|
| 237718 | 9/1987 | European Pat. Off. ............ 384/429 |
| 1078819 | 3/1960 | Fed. Rep. of Germany . | |
| 7520439 | 10/1975 | Fed. Rep. of Germany . | |
| 741411 | 2/1933 | France .................................. 74/596 |
| 856458 | 6/1940 | France .................................. 74/596 |
| 481269 | 5/1953 | Italy ...................................... 74/605 |
| 46-24082 | 7/1971 | Japan ................................... 74/603 |
| 26338 | of 1911 | United Kingdom .................. 74/603 |
| 176583 | 3/1922 | United Kingdom . | |
| 319960 | 10/1929 | United Kingdom .................. 74/603 |
| 625384 | 6/1949 | United Kingdom .................. 74/603 |
| 654121 | 6/1951 | United Kingdom ...................... 29/6 |

OTHER PUBLICATIONS

Smethwick, Cromol Crankshafts, Dec. 1945, Automobile Engineer, pp. 537–541.

Primary Examiner—Rodney M. Lindsey
Attorney, Agent, or Firm—Barnes & Thornburg

[57] ABSTRACT

A crankshaft with bearing pins and crank pins whereby the crank pins are delimited by counter weights constructed as webs or arms that extend transversely to the longitudinal axis of the crankshaft. These counter weights are circumcirculated during the rotation of the crankshaft at least by an air-oil-mixture in a crankcase and in an oil pan of the internal combustion engine. For reducing the power losses of the internal combustion engine by oil and or air-oil-mixture displacements by the webs or arms, the latter are constructed in their area disposed remote from the crank pins in the manner of aerodynamic bodies.

28 Claims, 2 Drawing Sheets

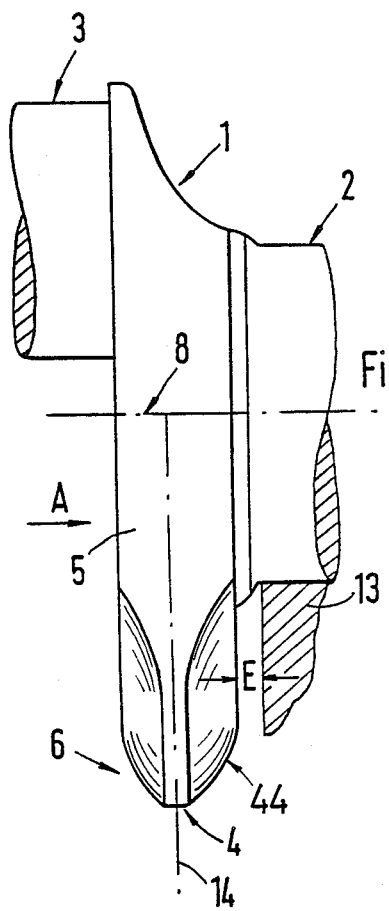
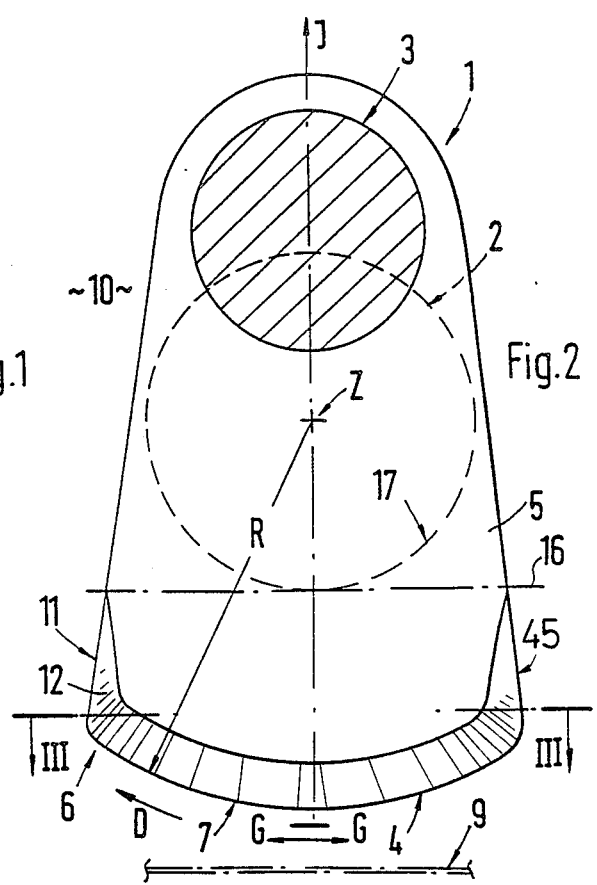
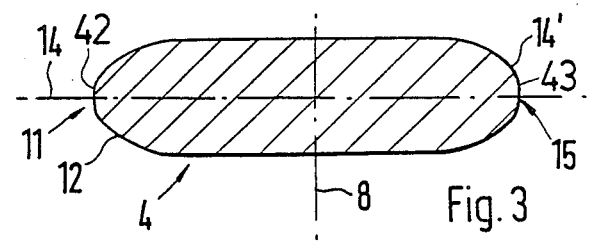

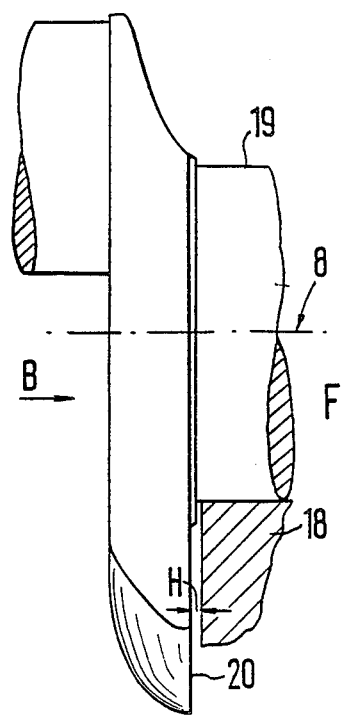
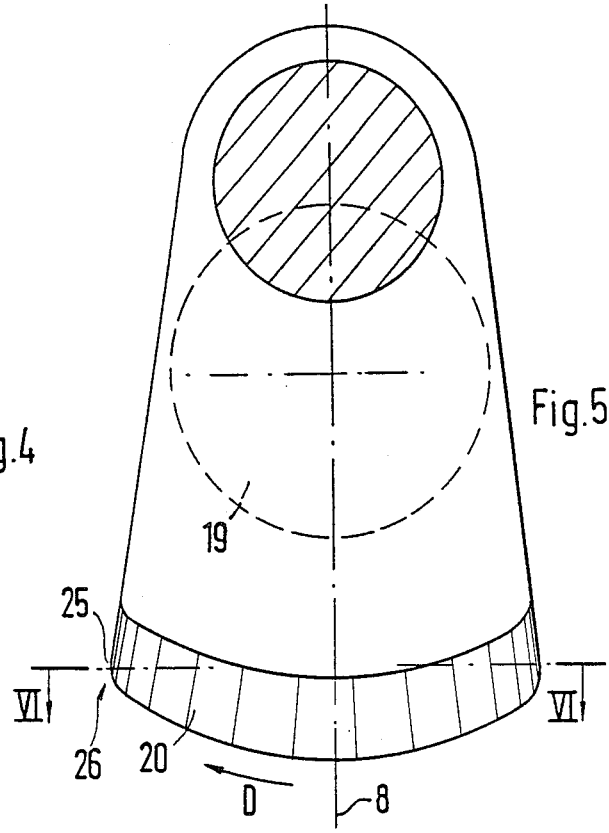
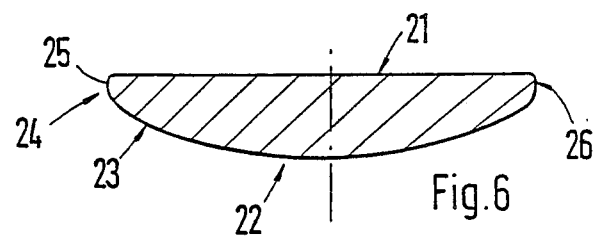
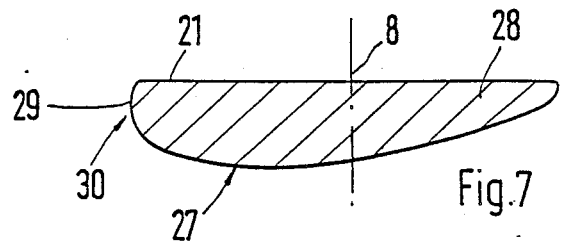

CRANKSHAFT FOR RECIPROCATING PISTON ENGINE

The present invention relates to a crankshaft for reciprocating piston engines, preferably internal combustion engines with bearing pins and crank pins, whereby the crank pins have ends delimited by counter weights extending transversely to the crankshaft axis and constructed as crankshaft webs or arms which during the rotation of the crankshaft are circumcirculated at least by an air-oil-mixture in a crankcase and in an oil pan.

In a known crankshaft of this type (U.S. Pat. No. 3,088,783), the forward and rear boundary of the webs—as viewed in the direction of rotation of the crankshaft—are delimited by straight surfaces that extend parallel to the axis of rotation of the crankshaft. During the operation of the crankshaft in an engine having a crankcase and an oil pan, in particular the forward boundary is subjected to a deceleration or braking action by reason of its areal configuration by the oil-air-mixture agitated in the crankcase and by the oil present in the oil pan, which leads to power output losses of the internal combustion engine.

It is the object of the present invention to make such provisions at the webs or arms of a crankshaft of a reciprocating piston engine that power output losses of the internal combustion engine, caused by flow resistances in the crankcase and in the oil pan, are reduced.

The underlying problems are solved according to the present invention in that for the reduction of the power output of the internal combustion engine by oil- and/or air-oil-mixture-displacements by the crankshaft webs, the latter are constructed in their area disposed remote from the crank pins with a profile in the manner of a flow promoting aerodynamic bodies.

The advantages achieved principally with the present invention reside in that by the construction of the webs as aerodynamic bodies, the power loss of the internal combustion engine, especially when the latter operates at relatively high rotational speed, is considerably reduced. These bodies at the crankshaft webs penetrate the air-oil-mixture in the crankcase and/or oil in the oil pan in a low resistance manner.

These and other objects, features and advantages of the present invention will become more apparent from the following description when taken in connection with the accompanying drawing which shows, for purposes of illustration only, several embodiments in accordance with the present invention, and wherein:

FIG. 1 is a partial elevational view of a crankshaft in accordance with the present invention;

FIG. 2 is an elevational view in the direction of arrow A of FIG. 1;

FIG. 3 is a cross-sectional view taken along line III—III of FIG. 2;

FIG. 4 is an elevational view, similar to FIG. 1, of a another embodiment in accordance with the present invention;

FIG. 5 is an elevational view taken in the direction of arrow B of FIG. 4;

FIG. 6 is a cross-sectional view, taken along line VI—VI of FIG. 5; and

FIG. 7 is a cross-sectional view, similar to FIG. 6, of a further embodiment in accordance with the present invention.

Referring now to the drawing wherein like reference numerals are used throughout the various views to designate like parts, only the crankshaft generally designated by reference numeral 1 of a reciprocating piston internal combustion engine for motor vehicles is illustrated in the various figures. The crankshaft 1 includes in the illustrated area a bearing pin 2 and a crank pin 3. The crank pin 3 has agreed delimited by a web or arm 4 constructed as counter weight 4 with a profile adjacent its outer edge which abuts the crank pin. The bearing pin 2 extends away from the web 4 which, according to FIG. 2, has a plate-shaped form. According to FIG. 2, the web 5 widens from the crank pin 2 up to an area 6 located remote from the same, whose boundary 7 is located on a radius R. The center Z of the radius R extends coaxially to a center longitudinal axis 8 of the crankshaft 1.

For reducing the power loss of the internal combustion engine by displacement of oil in an oil pan 9, respectively, of an oil-air-mixture in the space 10 of a crankcase, the web 5 is constructed within the area 6 a second profile in the manner of flow promoting aerodynamic body. A boundary 11 which is located forwardly in the direction of rotation D of the crankshaft 1, thereby has a tapering 12 pointing in the mentioned direction of rotation D.

The boundary area has increasing and varying widths as it extends away from the bearing pin 2 toward its outer radial area, the outer edge of which is defined by radius R. The cross-section of this boundary is in the form of a parallelogram at its edge surface along it tapering 12, the parallelogram changing its cross-section as it moves further away from axis 8. A center plane 14 of the web 5 extends at right angles to the axis of the bearing pin 2. The boundary 11 defining a first front surface having an edge portion 42 facing in the direction of rotation D and a second rear surface 15 having a rear edge portion 42 facing away from the direction of rotation. Varying parabolic cross-section of smooth continuous curves are thus provided because of radial tapering 44 (FIG. 1) and parabolic tapering 45 at right angles thereto along the direction of rotation.

Insofar as a relatively large free passage E (about 6 mm.) is provided between the web 5 and a bearing block 13 of the bearing 2, illustrated only partly, it is recommended to construct the tapering 12 symmetrically to a center plane 14 (FIG. 3) of the web 5 which extends transversely to the center longitudinal axis 8 of the crankshaft 1. The tapering 12 is constructed parabolically by means of which an aerodynamic shape of the web 5 is achieved. A similar tapering 14' is provided at the rear boundary 15 of the web 5. In lieu of the parabolic shape, there also exists the possibility to construct the tapering wedge-shaped or drop-shaped.

The taperings 12 and 15 commence within the area of an auxiliary line 16 (FIG. 2) which is tangential to the outer diameter 17 of the bearing pin 2. The tapering 12 is extended in the radial direction G—G of the web 5.

According to FIG. 4, the free passage H (about 2 mm.) between the bearing block 18 of the bearing pin 19 and the cheek 20 is relatively small. With this type of construction, the first side 21 of the web portion 20 which faces the bearing pin 19, lies on a straight line. By contrast, the second side 22, opposite the bearing pin 19, is provided with an aerodynamic curvature 23 which is constructed symmetrically to the longitudinal center axis 8 of the crankshaft 1. The forwardly disposed boundary 24 of the web portion 20 has a rounded-off configuration 25 extending away from the side 22 and passing over into the contour of the curvature 23. The rear boundary 26 is constructed analogously.

In FIG. 7, the curvature 27 extends asymmetrically to the longitudinal center plane 8 of the crankshaft 1 in such a manner that the web portion 28 has approximately the shape of a freely dropping water drop (drop shape) whose front side 29 is the forwardly disposed boundary 30 of the web portion 28.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A crankshaft for a piston engine, comprising integral bearing pin means and a crank pin means, the crank pin means having ends delimited by and connected to a counter weight means constructed as web means extending transversely to the crankshaft longitudinal axis, the web means being circumcirculated during rotation of the crankshaft at least by an air-oil-mixture in a crankcase and by oil in an oil pan of the engine, and the web means being constructed in an edge area disposed remote from the crank pin means with a second and different profile having a continuous smooth curve facing the direction of rotation of the crankshaft in the manner of a flow promoting profile for reducing the power loss of the engine by oil and/or air-oil-mixture displacement as the web means is rotated.

2. A crankshaft according to claim 1, wherein a forward boundary of the web means at the second profile, as viewed in the direction of rotation of the crankshaft, has a tapering.

3. A crankshaft according to claim 2, in which a relatively large free passage is present between the web means and a bearing block means of the bearing pin means, and wherein the tapering is shaped approximately parabolically and extends substantially symmetrically to a center plane of the web means, which center plane extends radially outward from and at right angles to the crankshaft longitudinal axis.

4. A crankshaft according to claim 3, wherein the parabolic tapering of the web means varies in width along the web means toward an outer edge of the web means as the web means extends in a radial direction from the crankshaft.

5. A crankshaft according to claim 2, wherein there is a further profile as viewed at a rear boundary edge of the web means in the direction opposite to the direction of rotation, and wherein the tapering and a further tapering of the rear boundary edge both begin at an area of the web means which substantially tangential to an outer diameter of the bearing pin means.

6. A crankshaft according to claim 1, in which a relatively small free passage is present between the web means and a bearing block means of the bearing pin means, wherein a first side of the web means facing the bearing pin means lies on a straight line whereas a second side opposite the first side facing the bearing pin means has an aerodynamic curvature.

7. A crankshaft according to claim 6, wherein at least the second profile of the web means has a rounded-off portion extending away from the first side, which passes over into the contour of the curvature.

8. A crankshaft according to claim 7, wherein the curvature extends substantially symmetrically to the longitudinal center axis of the crankshaft.

9. A crankshaft according to claim 7, wherein the curvature extends asymmetrically to the longitudinal center axis of the crankshaft and is so constructed that the web means has an approximate drop shape.

10. A crankshaft according to claim 6, wherein the curvature extends asymmetrically to the longitudinal center axis of the crankshaft and is so constructed that the web means has an approximate drop shape.

11. A crankshaft according to claim 3, wherein there is a further profile as viewed at a rear boundary edge of the web means in the direction opposite to the direction of rotation, and wherein the tapering and a further tapering of the rear boundary edge both begin at an area of the web means which is substantially tangential to an outer diameter of the bearing pin means.

12. A crankshaft according to claim 1, in which a relatively large free passage is present between the web means and a bearing block means of the bearing pin means, and wherein the tapering is shaped approximately parabolically and extends substantially symmetrically to a center plane of the web means, which center plane extends radially outward and at right angles to the crankshaft longitudinal axis.

13. A crankshaft according to claim 1, wherein the reciprocating piston engine is an internal combustion engine for a motor vehicle.

14. A crankshaft according to claim 2, wherein the tapering is parabolic and wherein the tapering extends symmetrically and at right angles with respect to a center line of the web means which extends between the centers of the bearing and crank pin means.

15. A crankshaft according to claim 14, wherein the parabolic tapering of the web means varies in width along the web means toward an outer edge of the web means as the web means extends in a radial direction from the crankshaft.

16. A crankshaft according to claim 15, wherein there is a further profile as viewed at a rear boundary edge of the web means in the direction opposite to the direction of rotation, and wherein the tapering and a further tapering of the rear boundary edge both begin at an area of the web means which is substantially tangential to an outer diameter of the bearing pin means.

17. A crankshaft according to claim 1, wherein a first side of the web means facing the bearing pin means lies on a straight line, whereas a second side opposite the first side facing the bearing pin means has an aerodynamic curvature and wherein the second profile of the web means has a rounded off portion extending away from the first side which passes over into the contour of the curvature.

18. A crankshaft according to claim 17, wherein the curvature extends substantially symmetrically with respect to the longitudinal center axis of the crankshaft.

19. A crankshaft according to claim 18, wherein the curvature extends asymmetrically to the longitudinal center axis of the crankshaft and is so constructed that the web means has an approximate drop shape.

20. A crankshaft for a piston reciprocating engine, comprising bearing pin means and crank pin means, the crank pin means having ends delimited by and connected to a counter weight means connected to the bearing pin means, the counter weight means constructed as web means extending transversely to the crankshaft longitudinal axis, the web means being circumcirculated during rotation of the crankshaft at least by an air-oil-mixture in a crankcase and by oil in an oil pan of the engine, and the web means being constructed at an outer area, located away from the crank pin means, with a first surface that faces the direction of rotation, comprising a plurality of different parabolic cross-section areas which decrease in thickness as the web means extends radially outward to its outmost edge to provide for a continuously curved flow promoting configuration for reducing the power loss of the engine by oil and/or air-oil-mixture displacement as the web means is rotated.

21. A crankshaft according to claim 20, wherein the web means has a second surface facing away from the direction of rotation and wherein said second surface is a mirror image of the first surface.

22. A crankshaft according to claim 19, wherein an outer edge of the web means has a parabolic configuration in a radial direction with respect to the crankshaft longitudinal axis.

23. A crankshaft according to claim 20, wherein an outer edge of the web means has a parabolic configuration in radial direction with respect to the crankshaft longitudinal axis.

24. A crankshaft for a piston reciprocating engine, comprising bearing pin means and crank pin means; the crank pin means having ends delimited by and connected to a counter weight means connected to the bearing pin means; the counter weight means constructed as web means extending transversely to the crankshaft longitudinal axis; the web means being circumcirculated during rotation of the crankshaft at least by an air-oil-mixture in a crankcase and by oil in an oil pan of the engine; the web means having an edge surface at right angles with respect to its rotational axis which is symmetrically shaped with respect to a center line extending between the axis of the bearing pin and crank pin means; and wherein an edge portion of the web means, which leads in the direction of rotation of the web means, has at its radial extent and leading toward a line tangential to an outer edge of the bearing pin means farthest from the crank pin means, a continuously curved flow promoting profile for reducing the power loss of the engine by oil and/or air-oil-mixture displacement as the web means is rotated; ad wherein that profile has two different and varying curvatures, one taken radially with respect to the longitudinal axis of the crankshaft, and the other taken at right angles with respect to the axis of the crankshaft.

25. A crankshaft according to claim 24, wherein the two different and varying curves are symmetrical with respect to a line drawn between the axis of the bearing and crank pin means.

26. A crankshaft according to claim 24, wherein the radial one of the two curvatures forms a mirror image starting at the drawn line between the axis of the bearing and crank pin means and extending in the direction of and away from the direction of rotation.

27. A crankshaft according to claim 24, wherein at least one of the curves is not symmetrical on both sides of the line drawn between the axis of the bearing and crank pin means and extending in the direction of and away from the direction of rotation.

28. A crankshaft according to claim 24, wherein neither curve is symmetrical with respect to the drawn center line between the axis of the bearing and crank pin means as viewed along the direction of rotation of the web means.

* * * * *